United States Patent
Vasilescu et al.

(10) Patent No.: US 8,106,944 B2
(45) Date of Patent: Jan. 31, 2012

(54) ADAPTIVE ILLUMINATION FOR COLOR-CORRECTED UNDERWATER IMAGING

(75) Inventors: Iuliu Vasilescu, Cambridge, MA (US); Alexander Bahr, Cambridge, MA (US); Carrick Detweiler, Somerville, MA (US); Daniela Rus, Weston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1414 days.

(21) Appl. No.: 11/624,369

(22) Filed: Jan. 18, 2007

(65) Prior Publication Data

US 2008/0084496 A1 Apr. 10, 2008

Related U.S. Application Data

(60) Provisional application No. 60/828,104, filed on Oct. 4, 2006.

(51) Int. Cl.
*H04N 7/18* (2006.01)

(52) U.S. Cl. .......... 348/81; 348/348; 382/162; 382/167; 382/254; 382/325

(58) Field of Classification Search .......... 348/81, 348/348; 382/162, 167, 254, 325
See application file for complete search history.

(56) References Cited

U.S. PATENT DOCUMENTS

| 4,542,959 | A | * | 9/1985 | Kreutzig | 359/885 |
|---|---|---|---|---|---|
| 5,382,499 | A | | 1/1995 | Keelan et al. | |
| 5,438,363 | A | * | 8/1995 | Ejima et al. | 348/223.1 |
| 5,719,715 | A | * | 2/1998 | Westhaver | 359/885 |
| 5,940,231 | A | * | 8/1999 | Westhaver | 359/885 |
| 6,822,795 | B2 | * | 11/2004 | Lai | 359/567 |
| 2001/0014238 | A1 | * | 8/2001 | Fredlund | 400/61 |
| 2005/0036035 | A1 | * | 2/2005 | Takemoto | 348/207.99 |
| 2005/0047134 | A1 | * | 3/2005 | Mueller et al. | 362/231 |

FOREIGN PATENT DOCUMENTS

| DE | 3914071 A1 | 10/1990 |
|---|---|---|
| EP | 0581697 A1 | 2/1994 |
| EP | 1293804 A1 | 3/2003 |
| JP | 2004-146928 A | 5/2004 |

OTHER PUBLICATIONS

Smith, Raymond et al.; Optical properties of the clearest natural waters (200-800nm); Applied Optics; Jan. 15, 1981; vol. 20, No. 2; pp. 177-184.

* cited by examiner

*Primary Examiner* — Liangchea Wang
(74) *Attorney, Agent, or Firm* — Guerin & Rodriguez, LLP; William G. Guerin

(57) ABSTRACT

Described are a method and an apparatus for color-corrected underwater imaging. A range to an underwater object to be imaged is determined and control values are selected according to the range. Control values are predetermined for a number of ranges according to an optimization of a color quality factor for each range based on the spectra of the optical sources used for illumination and the wavelength-dependent optical transmission of the water for the range. The optical power of each optical source is controlled according to a respective one of the selected control values. Advantageously, an acquired image requires no color correction as the adaptive illumination compensates for the wavelength-dependent losses in the light propagation path from the optical sources to the object and from the object to the imaging device.

22 Claims, 7 Drawing Sheets

RGB COEFFICIENT SET

ADAPTIVE ILLUMINATION FOR COLOR-CORRECTED UNDERWATER IMAGING

RELATED APPLICATION

This application claims the benefit of the earlier filing date of U.S. Provisional Patent Application Ser. No. 60/828,104, filed Oct. 4, 2006, titled "Apparatus and Methodology for Adaptive Illumination for True Color Underwater Images," the entirety of which is incorporated herein by reference.

FIELD OF THE INVENTION

The present invention relates generally to illumination of underwater objects. More particularly, the invention relates to a method and an apparatus for adaptive illumination for true color underwater imaging.

BACKGROUND OF THE INVENTION

Underwater photography and videography typically employ white light illumination sources. Wavelength-dependent losses occur as the light propagates through water. Longer wavelengths (e.g., red light) attenuate more rapidly than shorter wavelengths (e.g., blue light). Consequently, images are not captured in true color. Moreover, as the propagation distance changes, the changes in loss at different wavelengths are not equal. Absorption is the primary cause for loss in underwater propagation. Absorption is exponential with respect to the propagation distance, where the exponential value varies according to the wavelength of the light. Other factors such as scattering affect loss but are substantially independent of the wavelength of the visible light.

One technique known in the art to reduce the effect of wavelength-dependent loss on image color is based on applying a colored filter to the underwater camera. The filter attenuates blue light to substantially compensate for the dominant loss of red light in underwater propagation. As the loss is distance-dependent, a different filter is needed for different ranges to the object or scene of interest. This technique is impractical for many reasons. The distance to the scene may not be accurately controllable or may change rapidly in time. In some instances, there may not be sufficient time to change the filter or the camera may be remotely located so that the filter cannot be changed.

Another technique known in the art is based on determining the range to the object or scene to be imaged. According to this passive imaging technique, color absorption correction is applied to image data acquired by the camera. The camera must be modified or a separate device must be provided to perform the correction processing of the acquired image data.

What is needed is a method to adaptively illuminate an underwater object or scene to achieve true color images in real-time. The present invention satisfies this need and provides additional advantages.

SUMMARY OF THE INVENTION

In one aspect, the invention features an apparatus for color-corrected underwater imaging. The apparatus includes a plurality of optical sources, a range sensor, a memory module and a processor. Each optical source has a unique optical spectrum. The range sensor is adapted to determine a range to an underwater object to be imaged. The processor is in communication with the range sensor and the memory module. The processor selects a plurality of predetermined control values from the memory module in response to a range determined by the range sensor. An optical power each of the optical sources is controlled by the processor according to the selected predetermined control values for color-corrected imaging of the underwater object at the determined range. In one embodiment, the apparatus also includes a depth sensor and an ambient light sensor. According to the embodiment, the processor selects the predetermined control values from the memory module in response to the range determined by the range sensor, a depth determined by the depth sensor and an ambient light intensity determined by the ambient light sensor.

In another aspect, the invention features a method for color-corrected underwater imaging. A range to an underwater object to be imaged is determined and control values are selected in response to the range. The control values are predetermined according to an optimization of a color quality factor for the range. For each of the selected control values, an optical power of an illumination of the underwater object is controlled. Each illumination has a unique optical spectrum.

In another aspect, the invention features a method for determining a plurality of control values for controlling illumination of an underwater object using a plurality of optical sources. A water transmission spectrum is determined for each range in a plurality of ranges to the underwater object. For each range, a set of control values is determined in response to an optimization of a color quality factor for the illumination. The color quality factor is determined in response to a sum of transmission spectra where each transmission spectrum is determined as a product of an optical spectrum of a respective one of the optical sources and the water transmission spectrum for the range.

In still another aspect, the invention features a method for determining a plurality of control values for controlling illumination of an underwater object using a plurality of optical sources. A water transmission spectrum is determined for each range in a plurality of ranges to the underwater object. For each range, an ambient light transmission spectrum is determined for a plurality of depths. Each depth is a distance between a surface of the water and the underwater object. For each combination of one of the ranges and one of the depths, a set of control values is determined in response to an optimization of a color quality factor for the illumination. The color quality factor is determined in response to a sum of transmission spectra for the range and an ambient light transmission spectrum for the depth and range. Each transmission spectrum is determined as a product of an optical spectrum of a respective one of the optical sources and the water transmission spectrum for the range.

In yet another aspect, the invention features a method for color-corrected imaging of an underwater object. An RGB coefficient set is selected from a plurality of RGB coefficient sets. Each RGB coefficient set includes an R scale factor, a G scale factor and a B scale factor for each of a red sensor, a green sensor and a blue sensor. The selection is made in response to an optical spectrum of an illumination source and a range to the underwater object. For each pixel in a plurality of pixels in an acquired image of the underwater object, an RGB value comprising an R value, a G value and a B value of the pixel is transformed to a color-corrected RGB value based on a linear combination of the respective R scale factor, the G scale factor and the B scale factor in the selected RGB coefficient set. The RGB coefficient sets are predetermined for the optical spectrum of the illumination source for a plurality of ranges according to an optimization of a color quality factor.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

In brief overview, the invention relates to a method and an apparatus for color-corrected underwater imaging. A range to an underwater object to be imaged is determined and control values are selected according to the range. Control values are predetermined for a number of ranges according to an optimization of a color quality factor for each range based on the spectra of the optical sources used for illumination and the wavelength-dependent optical transmission of the water for the range. The optical power of each optical source is controlled according to a respective one of the selected control values. Advantageously, an acquired image requires no color correction as the adaptive illumination compensates for the wavelength-dependent losses in the light propagation path from the optical sources to the object and from the object to the imaging device. The method and apparatus can be used for a broad range of underwater imaging applications, including photography, prospecting, mapping and exploration, ship hull inspection, real-time human viewing of underwater objects, and underwater safety, security and monitoring operations.

Figure 1:
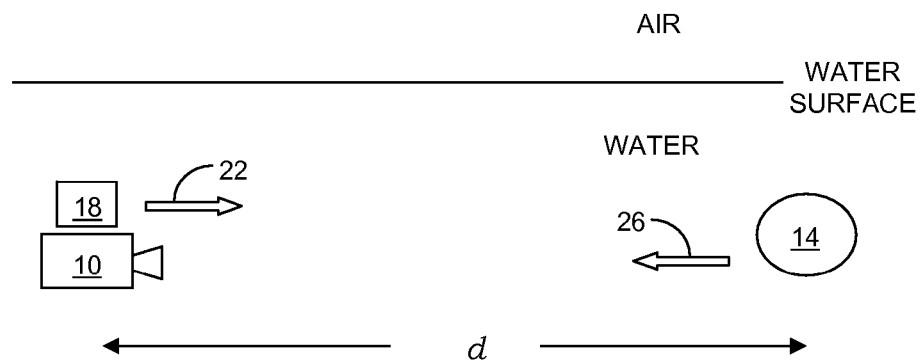
FIG. 1 is depicts an underwater environment in which a method of color-corrected underwater imaging according to the invention can be practiced.

FIG. 1 illustrates an underwater environment in which the method of the invention may be practiced. The environment can include any body of water such as a pool, lake, river or ocean. An underwater camera 10 is positioned to acquire images of an underwater object 14 (or scene) at a range d. As used herein, camera means a still image camera, a video camera or other image capture system adapted to acquire one or more images. The acquired images can be recorded on film, stored as digital data, or transmitted to remote devices using any of a variety of data transmission techniques. An illumination source 18 attached to or located near the camera 10 is used to illuminate the object 14. Generally, the light 22 from the illumination source 18 comprises white light or light having a substantially broad optical spectrum. More specifically, for visible illumination, the illumination source 18 emits light having a continuous optical spectrum comprising a wavelength spread at least across the visible spectrum (nominally 380 nm to 780 nm) although the optical power per unit wavelength is generally not constant at all wavelengths. The object 14 scatters the light 22 incident on its surface with a portion of the scattered light 26 being received at the camera 10.

Figure 2:
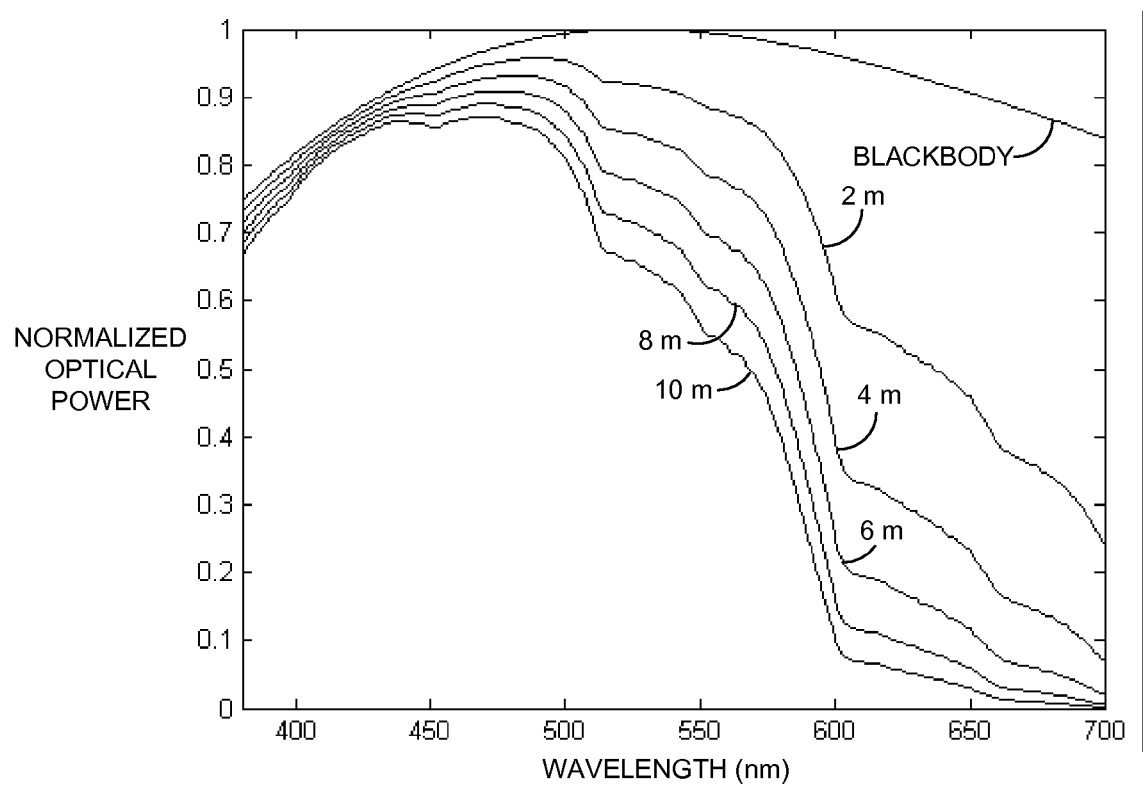
FIG. 2 is a graphical representation of how the wavelength-dependent absorption of water distorts a blackbody spectrum for different underwater propagation distances.

The light 22 propagating over the distance d from the camera 10 to the object 14 is subject to wavelength-dependent loss primarily due to absorption. FIG. 2 graphically shows how the wavelength-dependent absorption of water distorts a blackbody spectrum (shown for air) for different underwater propagation distances. Wavelengths at the red end of the wavelength range are attenuated severely, especially at longer propagation distances. Referring again to FIG. 1, the optical spectrum of the incident light 22 is modified by the wavelength-dependent reflectance of the object 14. Similarly, the scattered light 26 is modified by absorption over the range d in propagation from the object 14 to the camera 10. Thus the image generated at the camera 10 can be substantially distorted in color relative to an image acquired in air for the same range d. Furthermore, the color distortion increases with increasing separation between the camera 10 and the object 14.

According to the method of the invention, the light 22 propagating from the illumination source is "adjusted" in wavelength to compensate for the wavelength-dependent loss imparted over the round-trip distance 2d between the camera 10 and the object 14. Thus the color of the object 14 in the acquired image is nearly identical to the true color of the object 14 as defined by the wavelength-dependent reflectance of the object 14.

Figure 3:
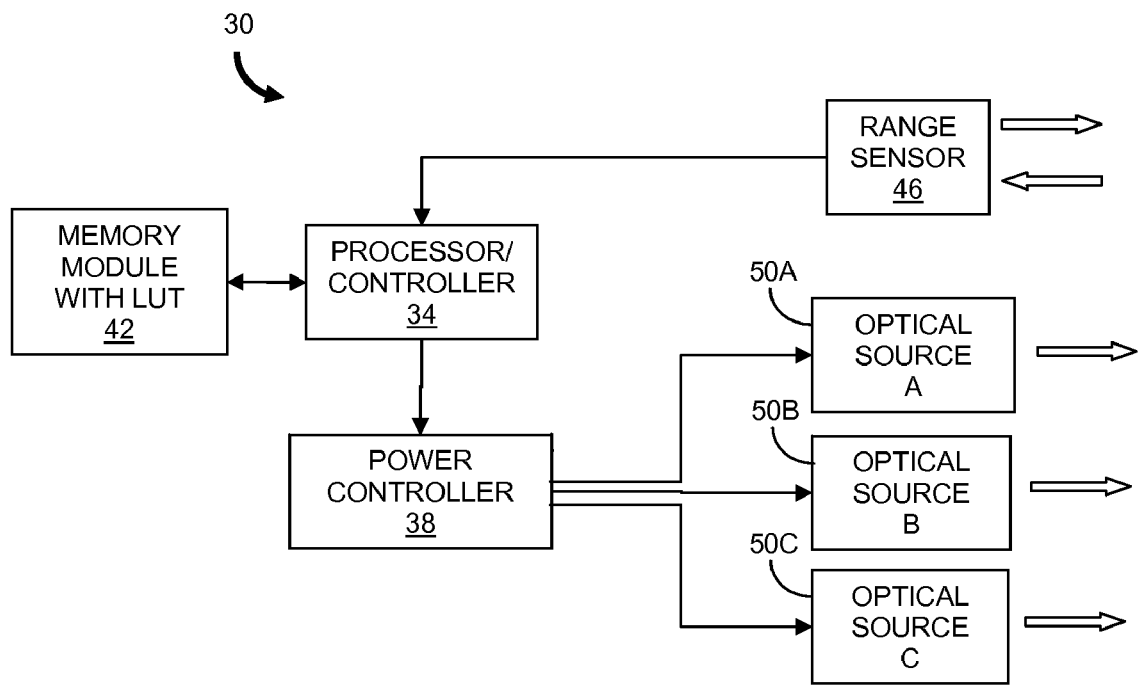
FIG. 3 is a functional block diagram depicting an embodiment of an adaptive underwater illumination apparatus according to the invention.

FIG. 3 is a functional block diagram depicting an embodiment of an adaptive underwater illumination apparatus 30 according to the invention. The apparatus 30 includes a processor 34 in communication with a power controller 38, memory module 42, range sensor 46 and optical sources 50A, 50B and 50C (generally 50) each having a unique optical spectrum. Although three optical sources 50 are shown, it should be recognized that other numbers (i.e., at least two) of optical sources 50 can be utilized according to the invention. In one embodiment, the power controller 38 comprises a separate electrical power controller for each optical source 50. In an alternative embodiment, the power controller 38 provides individually controllable power to each of the three optical sources 50. The range sensor 46 can be any one of a variety of range sensors, for example, acoustic range sensors (e.g., sonar) or optical range sensors.

During operation, the apparatus 30 is submerged in water. The range sensor 46 is directed towards the object 14 to be imaged. Range data provided by the range sensor 46 is provided to the processor module 34. The processor module 34 then selects a set of control values in a lookup table (LUT) stored in the memory module 42 corresponding to the measured range.

Table 1 shows an example of how control values are stored in the lookup table of the memory module 42. For each distance to the object $d_i$ (i=1 to n), a set of three control values $CV_{Ai}$, $CV_{Bi}$ and $CV_{Ci}$ corresponding to the three optical sources 50A, 50B and 50C, respectively, are stored. Each control value $CV_i$ represents the electrical power to be applied to the respective optical source 50 to achieve the desired optical power for color-corrected imaging at the measured range $d_i$.

Electrical power control is accomplished, for example, by modulating the pulse width of electrical current supplied to each optical source 50. In this example the control values $CV_i$ are proportional to the pulse width. Although this technique is based on pulse width modulation of electrical power, it should be recognized that the average optical power applied over an image acquisition interval (i.e., image exposure time) is also controlled. In an alternative technique, the amplitude of a current pulse of fixed duration may be modulated. In some embodiments in which continuous illumination sources such as spectrally-filtered incandescent or halogen light sources are used, the optical spectrum can change as the optical power changes. Thus it is preferable in such applications to utilize multiple sources having the same optical spectrum and to control the number of active sources at a constant optical power; however, the accuracy of the color correction can be compromised. To more accurately color correct the image, the optical power utilized from each source can be adjusted over a small range for which variations in the optical spectrum are not significant.

TABLE 1

| RANGE | OPTICAL SOURCE A | OPTICAL SOURCE B | OPTICAL SOURCE C |
|---|---|---|---|
| $d_1$ | $CV_{A1}$ | $CV_{B1}$ | $CV_{C1}$ |
| $d_2$ | $CV_{A2}$ | $CV_{B2}$ | $CV_{C2}$ |
| $d_3$ | $CV_{A3}$ | $CV_{B3}$ | $CV_{C3}$ |
| . | . | . | . |
| . | . | . | . |
| . | . | . | . |
| $d_n$ | $CV_{An}$ | $CV_{Bn}$ | $CV_{Cn}$ |

Figure 4:
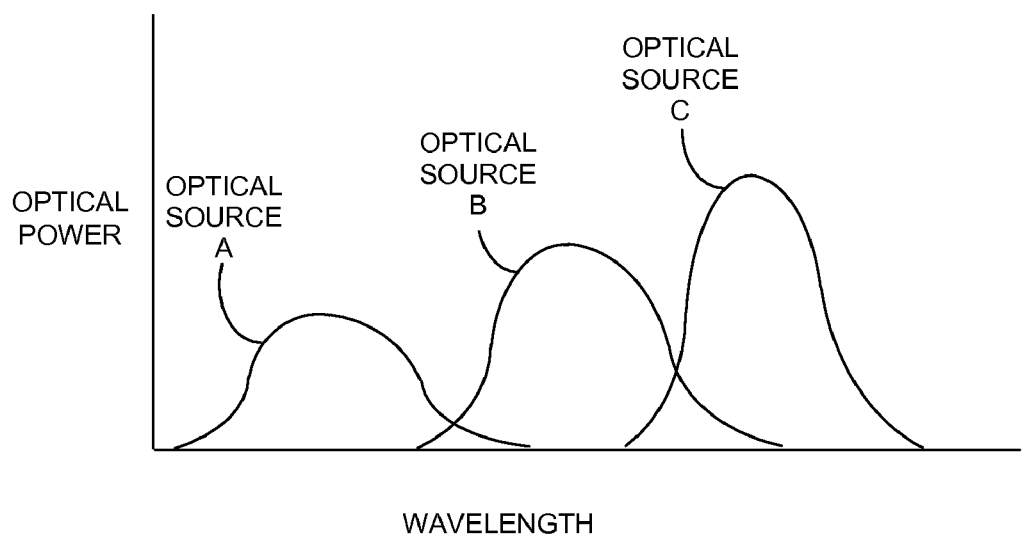
FIG. 4 is a graphical representation of the optical power spectrum of three different optical sources.

FIG. 4 graphically depicts an example of an optical power spectrum for each of the three optical sources 50. Optical source 50A contributes less power than optical source 50B. Optical source 50C contributes the most optical power for illuminating the object 14. Although the depicted optical spectra represent a specific example, it should be noted that an optical source 50 having the longest characteristic wavelength generally provides more optical power than the other optical sources 50 as the longer wavelengths are subject to greater attenuation in water.

Figure 5:
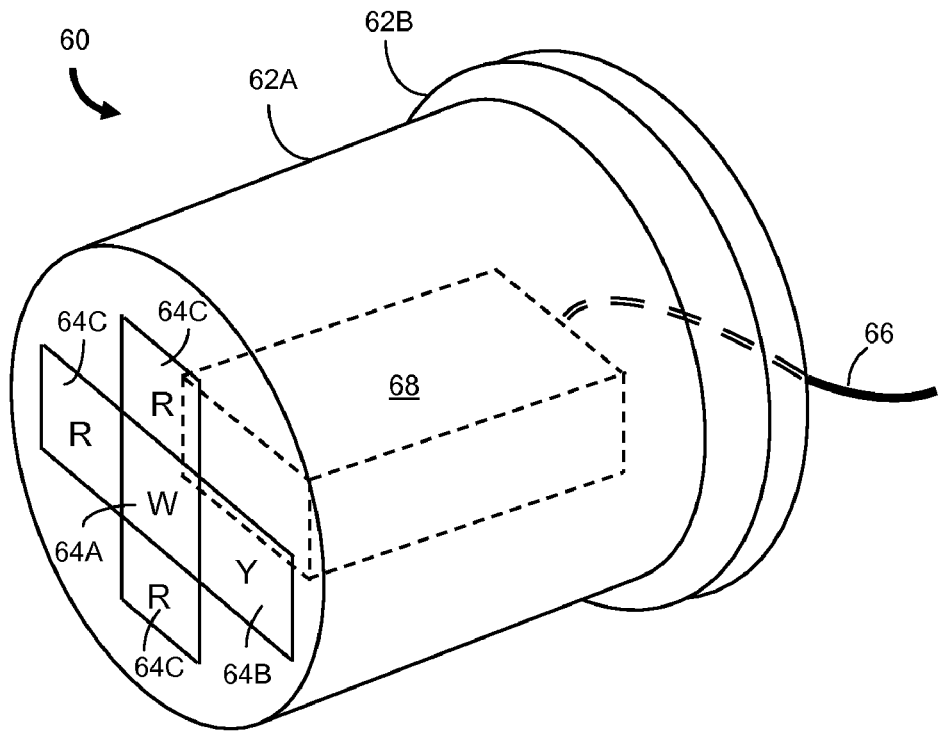
FIG. 5 is illustrates an embodiment of an apparatus for color-corrected underwater imaging according to the invention.

FIG. 5 illustrates an embodiment of an apparatus 60 for color-corrected underwater imaging according to the invention. The illustrated embodiment is particularly suited for underwater flash photography. The apparatus 60 includes a water-tight enclosure 62 comprising a cylindrical section 62A and a disk portion 62B. Power is supplied from an external source through a cable 66. The apparatus 60 also includes five flash elements 64, including one white flash element W 64A, one yellow flash element Y 64B and three red flash elements R 64C. The three red flash elements 64C are operated at similar optical powers so as to effectively define a single optical source 50 (FIG. 3). Thus the apparatus 60 includes three optical sources 50 each having a unique optical power spectrum.

Figure 6:
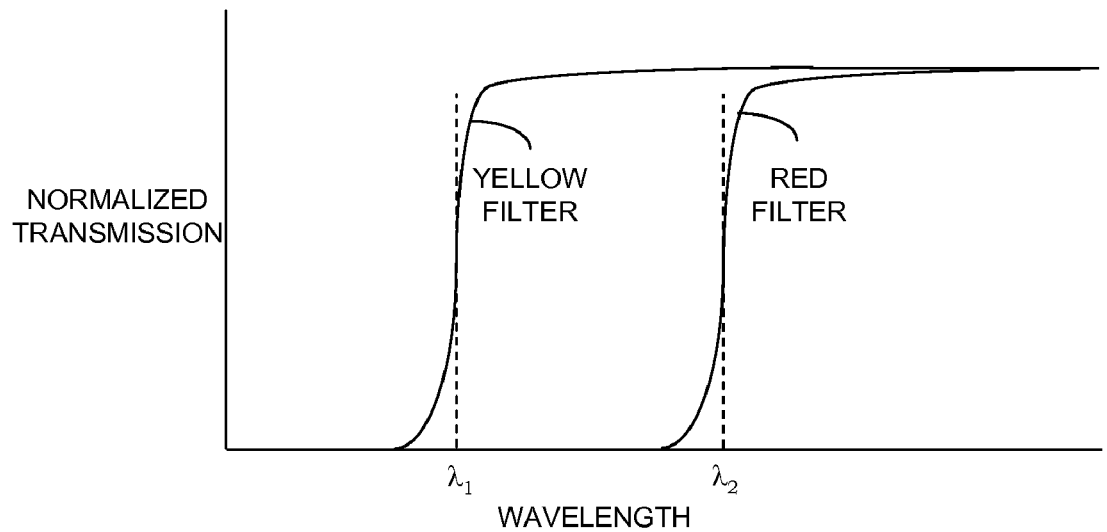
FIG. 6 is a graphical representation of the spectral transmissions of filters for the yellow and red flash elements of FIG. 5.

Each flash element 64 includes an electronic xenon flash lamp. The white flash element W 64A is not filtered and emits light that appears substantially white. Referring also to FIG. 6, the yellow flash element Y 64B includes an optical filter having a cutoff-wavelength $\lambda_1$ above which substantially all light is transmitted without loss while nearly all light at wavelengths below the cutoff wavelength $\lambda_1$ is blocked. Each red flash element R 64C includes an optical filter having a cutoff wavelength $\lambda_2$, leading to a red appearance for the filtered light. In one embodiment, multi-layer optical coatings as are known in the art are used to accurately define the desired cutoff wavelength and transmission characteristics of the optical filters.

The apparatus 60 also includes a range sensor (not shown) and an electronics module 68 (shown in phantom) which comprises a processor module, control electronics and electrical power storage components.

Figure 7:
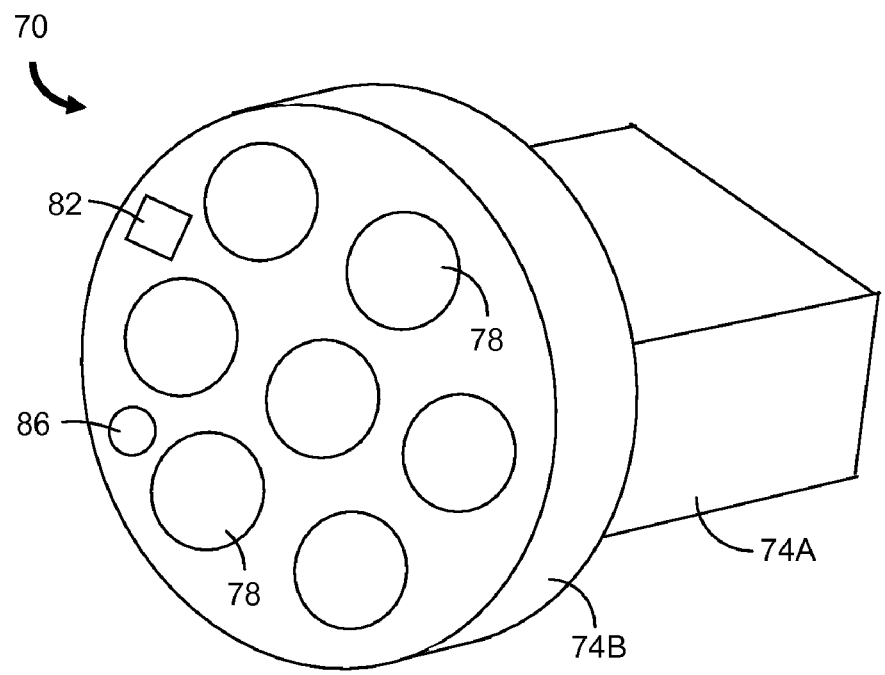
FIG. 7 illustrates another embodiment of an apparatus for color-corrected underwater imaging according to the invention.

FIG. 7 illustrates another embodiment of an apparatus 70 for color-corrected underwater imaging. The water-tight apparatus 70 includes an electronics enclosure 74A and a source portion 74B. The electronics enclosure 74A encloses processing and control electronics. The enclosure 74A also includes at least one electrical or optical connector to facilitate communications between the electronics and an imaging device. Preferably, the enclosure 74A includes an externally mounted handle or similar device permitting an operator to easily hold and maneuver the apparatus 70.

The source portion 74B includes an array of optical sources 78, a range sensor 82 and an ambient light sensor 86. In one embodiment, the optical sources 78 are similar to the flash elements 64 of FIG. 5. In an alternative embodiment, each optical source 78 includes one or more light emitting diodes (LEDs). Collimating or beam control optics can be used with the LEDs to efficiently collect and project the emitted light to illuminate an underwater object. In other embodiments, other types of light sources (e.g., incandescent lamps) having different wavelength characteristics are included and controlled in a similar manner to obtain color-corrected underwater images. Optical sources operated at constant optical power enable video imaging where the received images are color-corrected without the need for processing of the video data. Alternatively, the apparatus 60 can be used as an underwater flashlight, allowing an operator to perceive underwater objects in their true color.

The method of the invention enables an underwater object at a know range to be perceived by a user or a camera with true color, i.e., the apparent color when viewed in air. The method is based on an optimization of a color quality factor for multiple underwater ranges. For each range, the optical power contributions of the optical sources that yield the optimum (e.g., maximum) value of the color quality factor are determined. Preferably, the control values used to obtain the desired optical power contributions are determined and stored. In one embodiment, the color quality factor is a color rendering index (CRI) defined, for example, by the International Commission on Illumination (CIE) (see CIE Technical Report 13.3-1995). The CRI is a measure of the ability of a light source to reproduce the colors of objects illuminated by the light source in comparison to a reference source such as a defined blackbody radiator or sunlight. The best possible rendition of colors is indicated by a CRI of 100 while the poorest rendition is specified by a CRI of zero.

Determination of Control Values Through Optimization of CRI

In this section a method to determine control values used to obtain the desired optical power contributions for the optical sources is described. The described method is based on calculation of CRI values; however, the invention contemplates other methods in which the calculation of other color quality factors is employed. In addition, the described method addresses color perception as defined by the human eye. It should be recognized that the method can be adapted to color perception as defined by other imaging systems or devices.

For a given range d from the illumination source to the underwater object, the spectral irradiance $S_{de}^{2d}(\lambda)$ of the apparatus of the invention defined for the round-trip distance $2d$ is given by $$S_{de}^{2d}(\lambda) = S_{de}(\lambda)e^{-2d\varphi(\lambda)} = \sum_{i=1}^{n} p_i S_i(\lambda) e^{-2d\varphi(\lambda)} \quad (1)$$

where $S_i(\lambda)$ is the normalized spectral irradiance of an optical source, $\varphi(\lambda)$ is the wavelength-dependent absorption coefficient of water and $p_i$ is the optical power of the optical source. For filtered flash elements, $S_i(\lambda)$ is given by $$S_i(\lambda) = T_i(\lambda) S_{xe}(\lambda) \quad (2)$$

where $T_i(\lambda)$ is the spectral transmissivity of the optical filter for the optical source and $S_{xe}(\lambda)$ is the spectral irradiance of the optical source (e.g., a xenon strobe flash element).

Parameters $X_j$, $Y_j$ and $Z_j$ represent the responses integrated over wavelength for the three wavelength-dependent responsivities $\bar{x}(\lambda)$, $\bar{y}(\lambda)$ and $\bar{z}(\lambda)$ of the eye (see CIE 1931 and CIE 1964) for a $j^{th}$ object at a range d away in water. $X_j$, $Y_j$ and $Z_j$ are given by $$X_j = \int_{\lambda=380\,nm}^{780\,nm} S_{de}^{2d}(\lambda) R_j(\lambda) \bar{x}(\lambda) d\lambda \quad (3A)$$

$$Y_j = \int_{\lambda=380\,nm}^{780\,nm} S_{de}^{2d}(\lambda) R_j(\lambda) \bar{y}(\lambda) d\lambda \quad (3B)$$

$$Z_j = \int_{\lambda=380\,nm}^{780\,nm} S_{de}^{2d}(\lambda) R_j(\lambda) \bar{z}(\lambda) d\lambda. \quad (3C)$$

Similarly, the parameters $X_j^0$, $Y_j^0$ and $Z_j^0$ represent the responses integrated over wavelength for the three responsivities for the $j^{th}$ object at the range d in air as illuminated by sunlight. $X_j^0$, $Y_j^0$ and $Z_j^0$ are given by $$X_j^0 = \int_{\lambda=380\,nm}^{780\,nm} S_0(\lambda) R_j(\lambda) \bar{x}(\lambda) d\lambda \quad (4A)$$

$$Y_j^0 = \int_{\lambda=380\,nm}^{780\,nm} S_0(\lambda) R_j(\lambda) \bar{y}(\lambda) d\lambda \quad (4B)$$

$$Z_j^0 = \int_{\lambda=380\,nm}^{780\,nm} S_0(\lambda) R_j(\lambda) \bar{z}(\lambda) d\lambda \quad (4C)$$

where $S_0(\lambda)$ is the spectral irradiance of midday sunlight. The six response values are used to calculate the CRI as described in more detail below.

The CRI for purposes of the optimization method is effectively a measurement of the average distance, in a U, V, W color space, between the color coordinates of each of eight standardized CRI color samples illuminated by a reference source and the color coordinates of the respective samples when illuminated by the apparatus of the invention. (In an alternative embodiment, the CRI can be calculated using an additional six standardized color samples.)

The CRI is a function of the range d to the illuminated object and the relative optical power of each optical source in the apparatus. The relative optical power contributions to maximize the CRI are determined using standard optimization algorithms. The CRI is given by $$CRI = \frac{1}{8} \sum_{1}^{8} R_j, \quad j = 1 \ldots 8 \quad (5)$$

where $R_j$ is the color rendering index for the $j^{th}$ standardized CRI color sample and is given by $$R_j = 100 - 4.6 \Delta E_j, \quad j = 1 \ldots 8 \quad (6)$$

where $\Delta E_j$ is $$\Delta E_j = \sqrt{(U_j - U_j^0)^2 + (V_j - V_j^0)^2 + (W_j - W_j^0)^2}, \quad j = 1 \ldots 8 \quad (7)$$

$U_j^{10}$, $V_j^{10}$ and $W_j^{10}$ are the color coordinates of the $j^{th}$ sample illuminated in sunlight and viewed in air, and $U_j$, $V_j$ and $W_j$ are the color coordinates for the underwater image of the $j^{th}$ object at the range d as viewed at the apparatus. $U_j$, $V_j$ and $W_j$ are given by $$U_j = 13 W_j (u_j - u^0) \quad (8A)$$

$$V_j = 13 W_j (v_j - v^0) \quad (8B)$$

$$W_j = 25 Y_j^{1/3} - 17 \quad (8C)$$

where $u_j$ and $v_j$ are defined according to $$u_j = \frac{4 X_j}{X_j + 15 Y_j + 3 Z_j} \quad (9A)$$

$$u_j = \frac{4 X_j}{X_j + 15 Y_j + 3 Z_j} \quad (9B)$$

and $u^0$ and $v^0$ are defined according to $$u_j = \frac{4 X_j^0}{X_j^0 + 15 Y_j^0 + 3 Z_j^0} \quad (10A)$$

$$u_j = \frac{4 X_j^0}{X_j^0 + 15 Y_j^0 + 3 Z_j^0}. \quad (10B)$$

Figure 8:
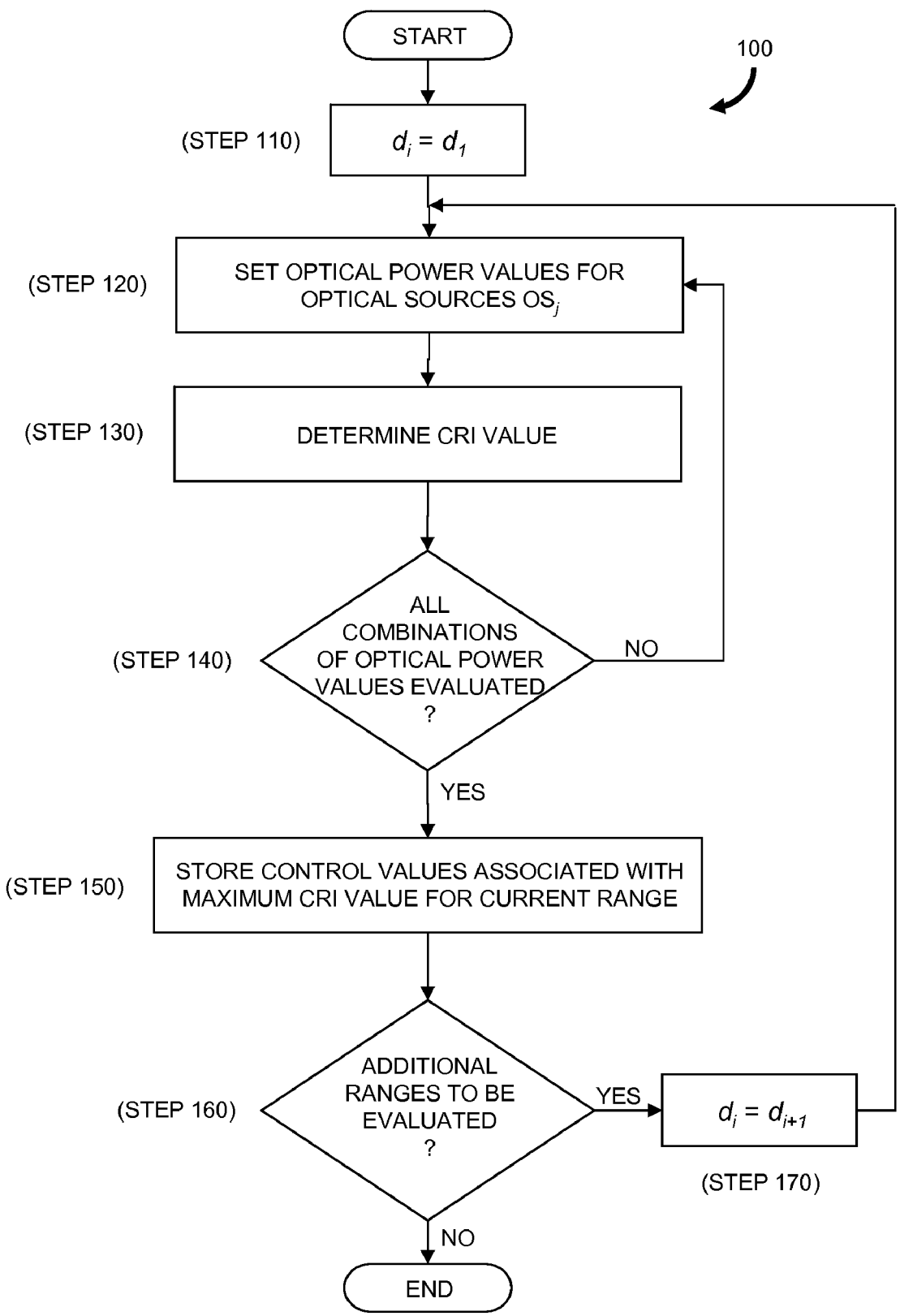
FIG. 8 is a flowchart representation of an embodiment of a method for determining control values in accordance with the invention.

FIG. 8 provides a flowchart illustrating an embodiment of a method 100 for determining control values in accordance with the invention. The determination of a CRI value is performed for each of a number of combinations of optical power contributions for the optical sources for an underwater range d. As depicted, the underwater range $d_i$ is set (step 110) at a first operational range $d_i$. A specific set of optical power values for the optical sources $OS_j$ (j=1 to n (number of optical sources)) are utilized (step 120) to determine (step 130) a CRI value. If other combinations of optical power values remain to be evaluated (step 140), the method 100 repeats steps 120 and 130. More specifically, each time step 120 is performed, a different combination of optical powers is used and the corresponding CRI values are determined in step 130. Once all predefined combinations of optical power values are utilized (step 140), the control values used to achieve the optical power values associated with the maximum CRI value for the range d are stored (step 150). If additional range values remain (step 160) for evaluation (i.e., i<n, where n is the maximum number of range values), the next range value $d_i$ is determined (step 170) and the method 100 returns through steps 120 to 150 to determine and store the corresponding control values. The method 100 is completed once control values are determined for all predetermined ranges $d_i$. In one embodiment, the control values indicate the electrical power to be applied to each optical source for the respective range $d_i$. For example, the control values can be stored as digital data indicating the pulse widths of the electrical currents or the amplitudes of current pulses to be applied as described above. For a continuous illumination device, the control values can be stored as digital data representing the constant values electrical currents or voltages applied to the optical sources.

As an alternative to the method 100 described above, control values can be determined according to a direct calibration of the apparatus for color-corrected underwater imaging. Such a calibration utilizes "real measurements" in a controlled measurement environment employing the apparatus, color samples and at least one of a camera, spectrometer and calorimeter. Generally the search space to determine the control values is large so consideration of restraints which limit the number of calibration measurements is desirable. Optimization techniques similar to those described above are utilized to determine the control value for each range $d_i$. In another alternative to the method 100, a partial calibration can be performed to determine values of absorption for the water for each range $d_i$. For example, water having a high algae content can have a significantly different wavelength-dependent loss than water with little or no algae. Thus measurements of the wavelength-dependent loss of water with known algae content may be desirable to assist in the calculation of the control values.

Figure 9:
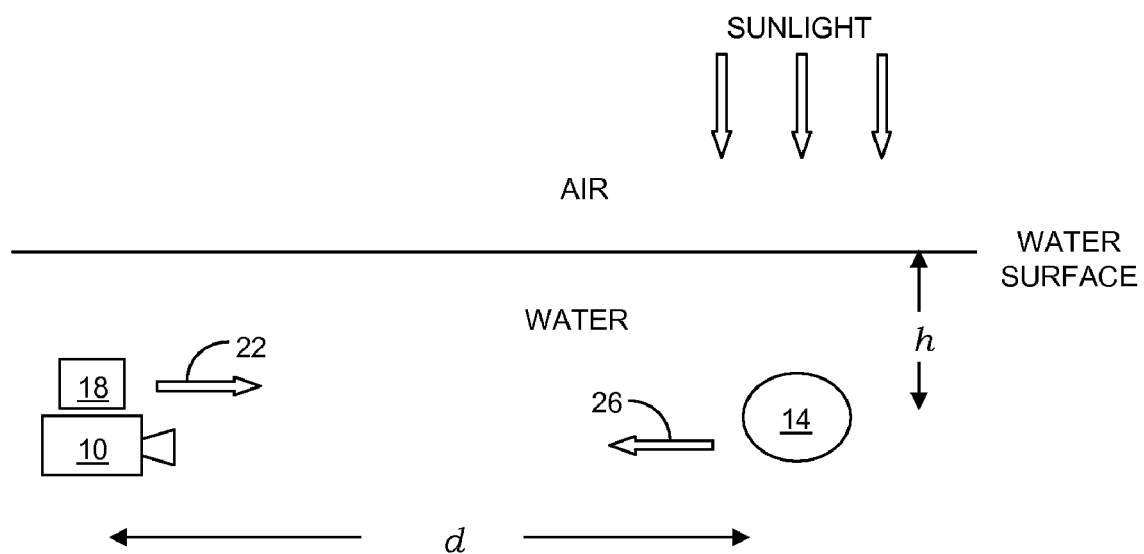
FIG. 9 depicts another underwater environment in which a method of color-corrected underwater imaging according to the invention can be practiced.

The method 100 for determining control values can be extended to accommodate ambient lighting of an underwater object. Referring to FIG. 9, an underwater environment in which the method of the invention may be practiced includes an underwater camera 10 configured to acquire images of an object 14 at a range d. The object 14 is below the surface of the water by a distance (i.e., depth) h. Additional illumination of the object 14 is due to sunlight that is attenuated in a wavelength-dependent manner between the surface of the water and the object 14. As depicted, the sunlight is at normal incidence with the surface of the water although the method can be modified for other solar illumination geometries by modifying the depth value h to indicate the actual optical path length for non-normal incidence. The sunlight incident on the object 14 is modified according to the spectral reflectance of the object 14 and then further attenuated during propagation from the object 14 to the camera 10. For example, to account for midday sun illumination of the object, the round-trip spectral irradiance $S_{de}^{2d}(\lambda)$ given by equation (1) above is replaced by the quantity $$S_{de}^{2d}(\lambda)+S_0(\lambda)e^{-(depth+d)*\phi(\lambda)} \tag{11}$$

where the second term represents the spectral irradiance at the camera 10 due to solar illumination of the object 14 and one-way propagation of the scattered solar illumination over the distance d from the object 14 to the camera 10.

Determination of RGB Coefficients Through Optimization of CRI

In one embodiment, the method for color-corrected imaging of an underwater object is based on using an illumination source having an optical spectrum that remains unchanged for all ranges. In contrast to the embodiments described above, the contributions of individual color sensors in the imager are controlled. For example, the contributions of the red, green and blue sensors to the RGB values of pixels in an RGB imager are controlled according to the object range d.

Figure 10:
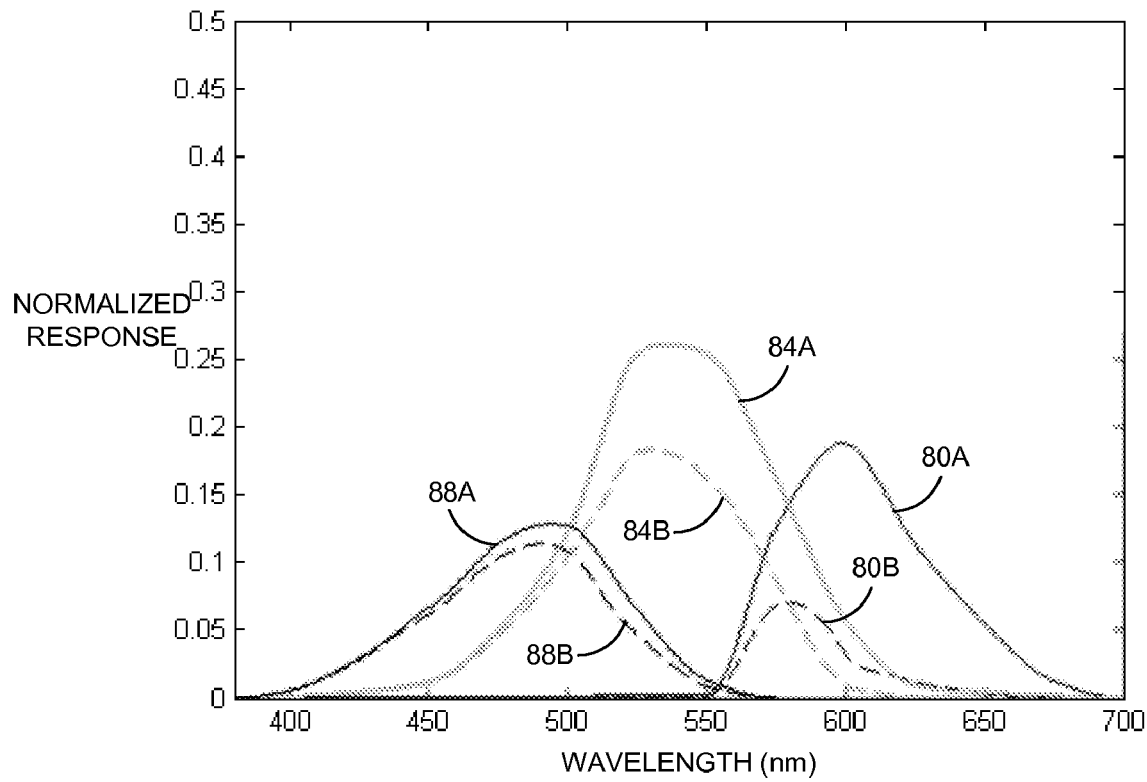
FIG. 10 graphically depicts the spectral responses of three color-dependent sensors for an object in air and in water at a fixed distance.

FIG. 10 graphically depicts the spectral responses of three color-dependent sensors for an object in air which remain substantially constant over a range of object distances d. Also shown are the spectral responses of the three color-dependent sensors for the same object at a distance d in water. The spectral responses in water vary according to the object distance d. While there is a significant response to higher wavelengths (greater than 600 nm) for in-air imaging with the red sensor (line 80A), when viewed underwater there is a substantially reduced response (dashed line 80B) to the longer wavelengths reflected from the object. The green sensor also exhibits a response (dashed line 84B) that is reduced with respect to its air response (line 84A), although not as pronounced as for the red sensor. The responses (line 88A and dashed line 88B) of the blue sensor in air and water are almost identical.

Figure 11:
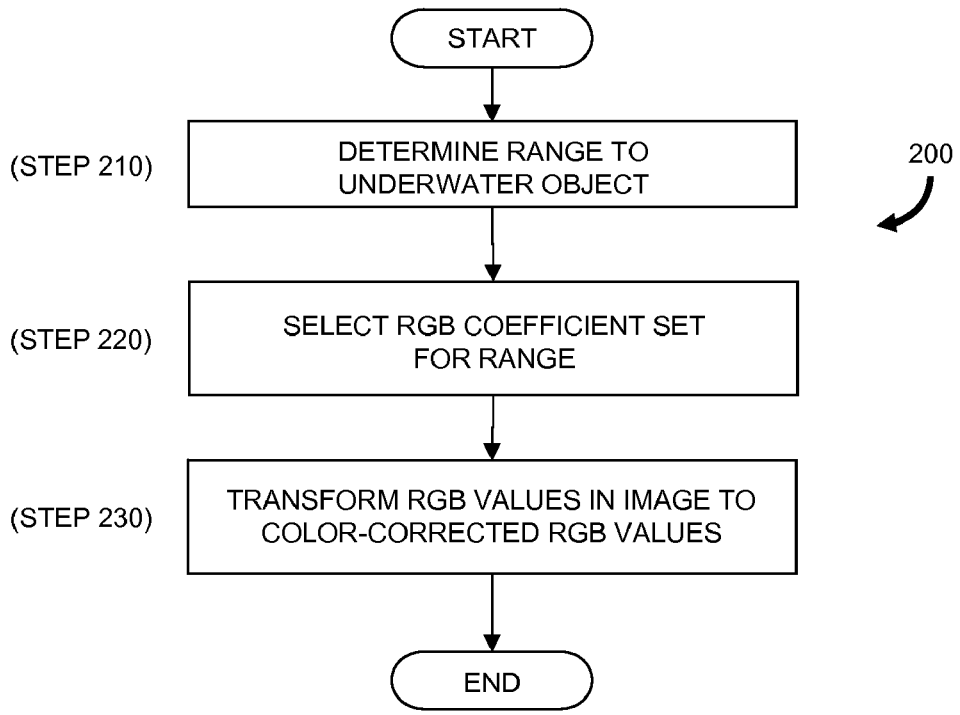
FIG. 11 is a flowchart representation of another embodiment of a method for color-corrected imaging of an underwater object according to the invention.
Figure 12:
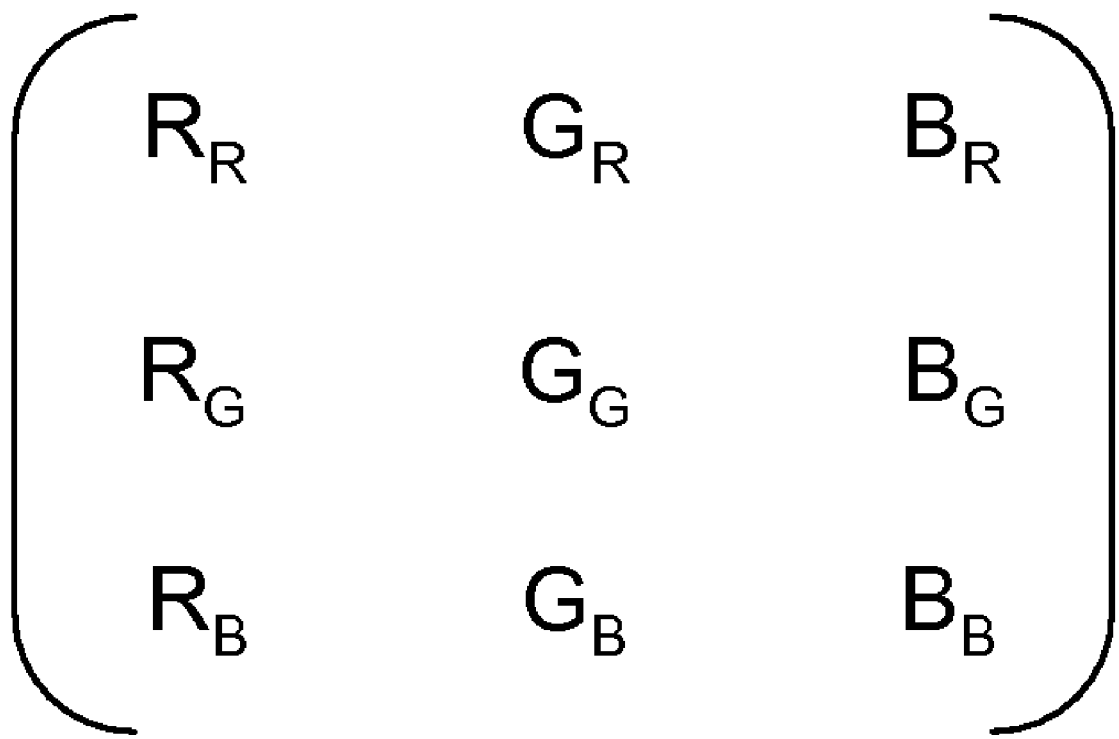
FIG. 12 depicts a single RGB coefficient set used in the method of FIG. 11.

FIG. 11 shows a flowchart depicting an embodiment of the method 200 for color-corrected imaging of an underwater object by controlling the contributions of the red, green and blue sensors to the RGB value for each pixel. In this embodiment, the spectrum of the illumination source remains constant regardless of the distance d to the object. A number of RGB coefficients sets are stored in memory with each set corresponding to a different object range d. FIG. 12 shows a single RGB coefficient set. The coefficient set includes nine values or "scale factors." A first subset of values includes an $R_R$ scale factor, a $G_R$ scale factor, and a $B_R$ scale factor used to modify the intensity value R provided by the red sensor during normal operation of the RGB imager. A different subset of three values comprising an $R_G$ scale factor, a $G_G$ scale factor and a $B_G$ scale factor are used to modify the intensity value B provided by the green sensor. Similarly, a third set of values $R_B$, $G_B$ and $B_B$ are used to modify the intensity value B from the blue sensor. In effect, each subset of RGB coefficients defines a linear combination of the R, G and B values to modify the color detected by a particular color sensor for a particular object range d. More specifically, the color-corrected red, blue and green values ($R_C$, $G_C$ and $B_C$, respectively) for a pixel are given by $$R_C=R_R+G_R+B_R \tag{12A}$$

$$G_C=R_G+G_G+B_G \tag{12B}$$

$$B_C=R_B+G_B+B_B \tag{12C}$$

Each RGB coefficient set is predetermined according to an optimization of a color quality factor, such as a CRI value, for a given range d and the fixed optical spectrum of the illumination source. For example, the RGB coefficients can be determined in a manner similar to the determination of the control values in the method 100 of FIG. 8. Thus various combinations of R, G and B scale factors are employed and the combination associated with the maximum CRI value is stored for each range d.

According to the method 200, the range d to the object is determined (step 210) and the stored RGB coefficient set associated with that range d is selected (step 220). The RGB value of each pixel in the image of the object is transformed (step 230) into a color-corrected RGB value using the selected RGB coefficient set. The transformation can occur in a concurrent processing manner so that a user can receive color-corrected underwater images in real-time. Alternatively, the method 200 can be performed in a post-processing manner so that images acquired at an earlier time and stored with range distance information can be corrected at a later time. If the range d to the object changes between images, a subsequent image uses a different RGB coefficient set mapped to the new range d.

In another embodiment, the RGB coefficients are also associated with the depth h of the object. In such an embodiment, the selection of the RGB coefficients is based on both range and depth information so that ambient lighting of the object can be accommodated in the color-correction. In a further embodiment, the intensity of the ambient light is also determined and used in selection of the proper RGB coefficients.

While the invention has been shown and described with reference to specific embodiments, it should be understood by those skilled in the art that various changes in form and detail may be made therein without departing from the spirit and scope of the invention.

What is claimed is:

1. An apparatus for color-corrected underwater imaging comprising:
    a plurality of optical sources each having a unique optical spectrum;
    a range sensor adapted to determine a range to an underwater object to be imaged;
    a memory module; and
    a processor in communication with the range sensor and the memory module, the processor selecting a plurality of predetermined control values from the memory module in response to a range determined by the range sensor, the processor controlling an optical power of each of the optical sources in response to the selected predetermined control values for color-corrected imaging of the underwater object at the determined range.

2. The apparatus of claim 1 wherein the optical sources comprise filtered flash elements.

3. The apparatus of claim 1 wherein the optical sources comprise light emitting diodes.

4. The apparatus of claim 1 further comprising a sensor adapted to receive an image of the underwater object.

5. The apparatus of claim 1 further comprising a depth sensor and an ambient light sensor, wherein the processor selects the predetermined control values from the memory module in response to the range determined by the range sensor, a depth determined by the depth sensor and an ambient light intensity determined by the ambient light sensor.

6. The apparatus of claim 1 wherein the sensor comprises one of a camera, a video camera and an eye.

7. The apparatus of claim 1 wherein the predetermined control values are determined in a calibration procedure to optimize a color quality factor.

8. The apparatus of claim 7 wherein the color quality factor is a color rendering index.

9. The apparatus of claim 7 wherein the color quality factor is determined with respect to a blackbody reference source.

10. A method for color-corrected underwater imaging, the method comprising:
    determining a range to an underwater object to be imaged;
    selecting a plurality of control values in response to the range, the control values being predetermined according to an optimization of a color quality factor for the range; and
    for each of the selected control values, controlling an optical power of an illumination of the underwater object, each illumination having a unique optical spectrum, wherein an image of the underwater object is color-corrected.

11. The method of claim 10 further comprising receiving the color-corrected image on an image sensor.

12. The method of claim 10 wherein the image sensor comprises one of a camera, a video camera and an eye.

13. The method of claim 10 wherein the control value is predetermined according to an optimization of a color quality factor for the range and a depth of the underwater object.

14. The method of claim 13 wherein the color quality factor is a color rendering index.

15. The method of claim 13 wherein the color quality factor is determined with respect to a blackbody reference source.

16. The method of claim 10 wherein predetermining the control values comprises:
    determining a water transmission spectrum for a plurality of ranges to the underwater object; and
    for each range, determining a set of control values in response to the optimization of the color quality factor for the illumination, the color quality factor being determined in response to a sum of transmission spectra, each transmission spectrum being determined as a product of an optical spectrum of a respective one of the optical sources and the water transmission spectrum for the range.

17. The method of claim 16 wherein the range comprises a round-trip optical path between the optical sources and the underwater object.

18. The method of claim 16 wherein the color quality factor is a color rendering index.

19. The method of claim 10 wherein predetermining the control values comprises:
    determining a water transmission spectrum for a plurality of ranges to the underwater object;
    for each range, determining an ambient light transmission spectrum for a plurality of depths, each depth being a distance between a surface of the water and the underwater object; and
    for each combination of one of the ranges and one of the depths, determining a set of control values in response to the optimization of the color quality factor for the illumination, the color quality factor being determined in response to a sum of transmission spectra for the range and an ambient light transmission spectrum for the depth and range, each transmission spectrum being determined as a product of an optical spectrum of a respective one of the optical sources and the water transmission spectrum for the range.

20. The method of claim 19 wherein the color quality factor is a color rendering index.

21. The method of claim 19 wherein the range comprises a round-trip optical path between the optical sources and the underwater object.

22. The method of claim 19 wherein the ambient light transmission spectrum is scaled according to a measurement of an ambient light intensity.

* * * * *